United States Patent [19]

Harvey

[11] 4,432,625
[45] Feb. 21, 1984

[54] FILM AND PAPER ASSEMBLY FOR FILM CARTRIDGES

[75] Inventor: Douglass C. Harvey, Rochester, N.Y.

[73] Assignee: Eastman Kodak Company, Rochester, N.Y.

[21] Appl. No.: 336,135

[22] Filed: Dec. 31, 1981

[51] Int. Cl.³ .............................................. G03B 17/26
[52] U.S. Cl. ................................... 354/275; 242/71.2; 430/501
[58] Field of Search ....................... 354/275; 242/71.2; 430/501

[56] References Cited

U.S. PATENT DOCUMENTS 733,539 7/1903 Cady .................................... 430/501
1,255,017 1/1918 Jones .................................... 430/501

Primary Examiner—John Gonzales
Attorney, Agent, or Firm—R. L. Randall

[57] ABSTRACT

In a film cartridge employing roll film with a backing strip, film flatness is improved by means of two innovations which are employed either individually or in combination, depending on the specific type of film cartridge involved. First, to prevent the relative slippage between the paper and the backing strip, resulting from "clock springing" of the film supply roll, the trailing end of the film is attached to the backing strip. Second, the film and backing strip assembly is provided initially with sufficient extra backing strip in the film take-up chamber to guarantee that there will always be a surplus of backing strip in that chamber so that only the film will be tensioned by the rotation of the take-up roll.

3 Claims, 4 Drawing Figures

U.S. Patent     Feb. 21, 1984     4,432,625
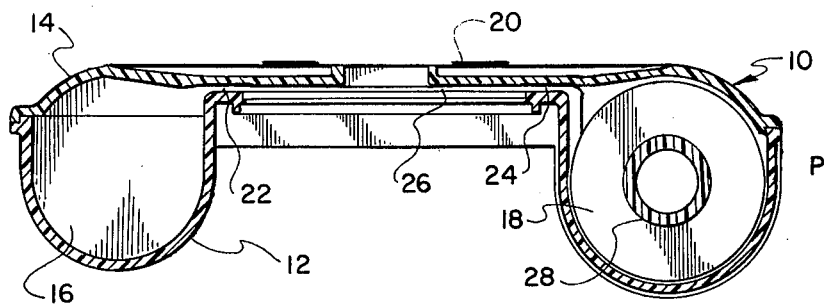
FIG. 1
PROIR ART
FIG. 2
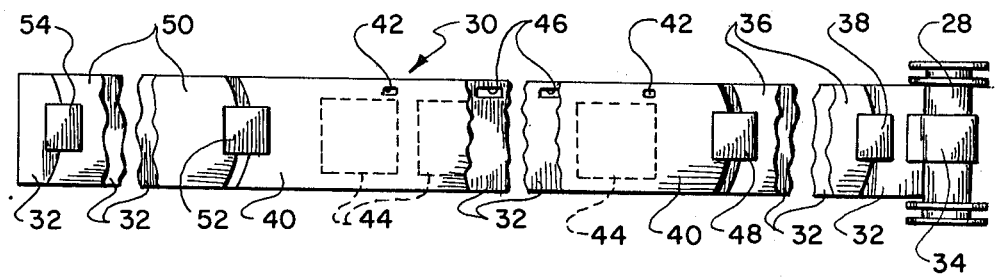
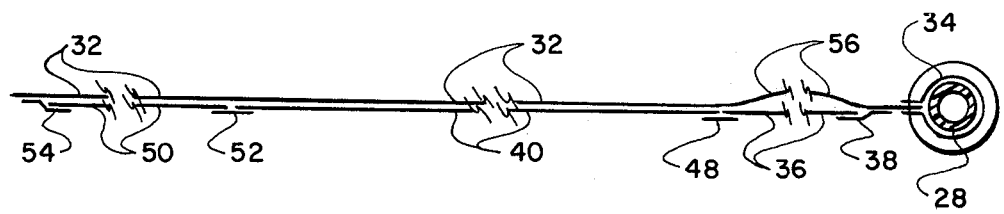
FIG. 3
FIG. 4
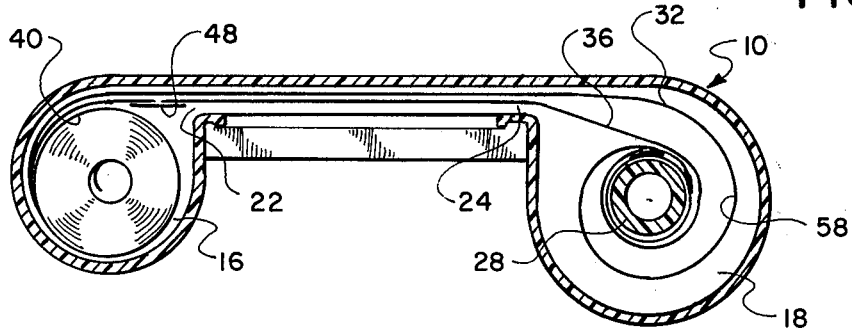

FILM AND PAPER ASSEMBLY FOR FILM CARTRIDGES

BACKGROUND OF THE INVENTION

1. Field of the Invention

The present invention relates to film cartridges employing roll film provided with a protective backing strip, and, more particularly, the invention relates to improving the reliability of such film cartridges with respect to maintaining the flatness of the film in its exposure plane.

2. Description of the Prior Art

U.S. Pat. No. 3,138,084, issued in my name on June 23, 1964, is directed to the general type of film cartridge to which the present invention relates and describes in considerable detail the film flatness problem inherent in such a cartridge because of the use of an opaque backing strip. Briefly, this problem is attributable to the difference in radii of the film and backing strip at their respective points of tangency to the supply and take-up rolls and to the varying ratio between the radii of the supply and take-up rolls during progressive stages of film advancement.

Because the backing strip is wound outside the film, though both are wound together, each convolution of backing strip is slightly longer than the corresponding convolution of film. Although not intuitively apparent, the fact that the circumference of a convolution is equal to $\pi$ times its effective diameter dictates that the difference in length between the corresponding film and backing strip convolutions is a function only of the effective thickness of those convolutions and is independent of the diameter of the roll. In other words, assuming that the roll is tightly wound, the backing strip surplus generated by each rotation of the supply roll is equal to the extra length of backing strip required for each rotation of the take-up roll, regardless of the diameters of those rolls. However, unless the two rolls are of exactly the same diameter, one roll rotates more than the other whenever film is advanced. Consequently, if the supply roll is larger than the take-up roll, a backing strip shortage occurs between the rolls and, if the supply roll is smaller than the take-up roll, a paper excess will occur. In a compact film cartridge of the type under consideration, surplus film, created by a backing strip shortage, cannot be absorbed readily and will result in buckling of the film in the exposure plane.

In accordance with previously cited U.S. Pat. No. 3,138,084, this situation is addressed in conventional 126 type film cartridges by choosing the dimensions of the cartridge and film components such that enough surplus backing strip is generated by the initial unwinding of the supply roll, before the film reaches the takeup roll, to make up for the surplus film generated thereafter before the take-up roll becomes as large as the supply roll. This approach has proven to be quite satisfactory under most circumstances. However, in some cases, the supply roll may "clock spring" in its chamber after the film has been partially advanced. If this occurs, the backing strip and film in the supply chamber slip longitudinally relative to one another as the supply roll enlarges to fill the supply chamber. Consequently, the supply roll is again larger than the take-up roll and film flatness in the exposure area is thereafter impaired by a backing strip shortage. This occurance can arise, for example, if the film and backing strip initially do not have proper stiffness or "curl" characteristics and/or if the cartridge is exposed to excessive vibrations or temperature conditions.

One approach to the potential "clock springing" problem is disclosed in British Pat. No. 1,112,349, published on May 1, 1968, which proposes confining the supply roll by means of a resilient spring or pad so that it cannot "clock spring" in the film supply chamber. This approach, however, requires the use of at least one additional cartridge component and poses the possibility of producing pressure marks on the film and/or undesirably increasing the force required to advance the film.

Another approach to the potential backing strip shortage problem is proposed by U.S. Pat. No. 3,614,012, issued on Oct. 19, 1971, and is used in conventional 110 type film cartridges. In accordance with this approach, the film take-up core is substantially as large in diameter as the interior of the film supply chamber so that the take-up roll is always larger than the supply roll. However, this approach is incompatible with improving the film flatness characteristics of conventional 126 type film cartridges, because it would require increasing the size of the film take-up chamber and would thus make the improved cartridge unusable in existing cameras.

The foregoing considerations are directed to eliminating a "net" shortage of backing strip, which means that there is less backing strip than film extending between the two rolls. Even if such a net shortage is theoretically eliminated by one of these approaches, a surplus of film can nevertheless occur in the film exposure region. This condition can arise because the backing strip surplus is generated in the supply chamber rather than in the take-up chamber. Accordingly, the backing strip may be relatively taut between the supply chamber and the take-up roll, and, therefore, is not completely compliant to the film. Also, because the backing strip moves between the rolls slightly faster than does the film, its frictional engagement with the film tends to move surplus film from the supply chamber into the exposure region. This situation, in conventional roll film cameras, is recognized in U.S. Pat. No. 1,170,674 issued on Feb. 8, 1916, which proposed to eliminate the problem by providing the backing strip, intermediate the film ends, with a longitudinally expansible section comprising a tuck or double fold in the backing strip. In such cameras, the film was simply stretched over a support frame to provide a relatively flat exposure region and there was adequate room behind the film in the exposure region to accommodate the passage and unfolding of the expansible backing strip section. This approach is not applicable to a film cartridge of the type to which the present invention is directed, because the tuck or folded section of the backing strip would almost certainly jam in a film guide channel or throat of such a cartridge.

SUMMARY OF THE INVENTION

In accordance with the present invention, the problem of film flatness impairment discussed above is solved without requiring modifications of conventional cartridge casing structures and without significantly increasing the overall cartridge cost. This is accomplished by means of two innovations, each of which are employed either individually or in combination, depending on the specific type of film cartridge involved. First, to prevent the relative slippage between the paper and the backing strip, resulting from "clock springing"

of the film supply roll, the trailing end of the film is attached to the backing strip. Second, the film and backing strip assembly is provided initially with sufficient extra backing strip in the film take-up chamber to guarantee that there will always be a surplus of backing strip in that chamber so that only the film will be tensioned by the rotation of the take-up roll.

Various means for practicing the invention and other features and advantages thereof will be apparent from the following description of illustrative preferred embodiments, reference being made to the accompanying drawings.

DESCRIPTION OF THE DRAWINGS

In the drawings:

FIG. 1 is a cross-sectional view of an empty conventional 126 type film cartridge.

FIG. 2 is a fragmentary plan view of a film and backing strip assembly according to the illustrative preferred embodiment of the invention;

FIG. 3 is a schematic side view of the film and backing strip assembly shown in FIG. 2; and FIG. 4 is a schematic representation showing an initial condition of the film and backing strip assembly depicted in FIGS. 2 and 3, with such an assembly loaded into a film cartridge.

DESCRIPTION OF THE ILLUSTRATIVE PREFERRED EMBODIMENT

As shown in FIG. 1, a conventional 126 type film cartridge comprises a casing 10 formed by a front member 12 and a rear member 14, which cooperate to define a film supply chamber 16 connected to a film take-up chamber 18 by an intermediate section 20. The intermediate section 20, in turn, is provided with narrow film guide channels or throats 22 and 24, which are adjacent the respective chambers 16 and 18 at opposite sides of a flat forwardly-facing support surface 26. A take-up core 28 is rotatably mounted in a take-up chamber and includes means, not shown, by which it is rotatable by the film advancing mechanism of a camera. In a conventional cartridge of this type, a roll of film and backing strip is initially housed in the supply chamber with the leading end of the film attached to the backing strip, which extends beyond the film, through the intermediate cassette section, and into the take-up chamber, where it is attached to the take-up core. Further details of such cartridge features are shown and described in the previously identified U.S. Pat. No. 3,138,084.

As best shown in FIGS. 2 and 3, the film and backing strip assembly 30, according to the illustrative preferred embodiment of the invention, comprises a backing strip 32, typically made of opaque paper, attached at its leading end to take-up core 28 by a piece of adhesive tape 34 or the like, which is commonly referred to as a paster. Closely adjacent the core paster 34, the leading end of a paper or plastic film leader strip 36 is attached to the backing strip 32 by a leader paster 38. Alternatively, leader strip 36 could be attached to the core and the backing strip 32 could be attached to the leader strip, or, both such strips could be attached to the core by a single paster.

The illustrative film strip 40 is similar to a conventional 126 type film strip and includes a series of metering perforations 42, each of which is associated with a corresponding film exposure area 44 and aligned with a corresponding backing strip slot 46 which allows a metering pawl in the camera to project through both film and the backing strip. The leading end of the film strip is attached to the trailing end of the leader strip by a leading film strip paster 48 and the trailing end of the film strip is similarly attached to the leading end of a paper trailer strip 50 by a trailing film paster 52. The trailing end of the paper or plastic trailer strip 50, in turn, is attached to the trailing portion of the backing strip strip 32 by a trailer paster 54. As illustrated by the paper loop or bow identified by numeral 56 in FIG. 3, an important feature of the invention relates to the fact that the length of the backing strip between pasters 38 and 54 exceeds the combined length of the film and leader strips between those pasters to provide excess paper in the take-up chamber, as will be described in greater detail below. Also, it should be apparent that the film strip could be made longer and could be attached directly to the backing strip by pasters 38 and 54, but that the provision of the leader and trailer strips 36 and 50 eliminates the wastage of film that would occur in that case. Accordingly, it should be understood that the term "film strip element", as used herein, does not necessarily refer only to the film strip per se but also includes such components as leader strip 36, trailer strip 50 and pasters 48 and 52, which may be employed to increase the effective length of the film strip between its points of attachment to the backing strip 32.

During the manufacture of the film and backing strip assembly, the trailing end of trailer strip 50 of the film strip element is attached to the trailing portion of the backing strip 32 by paster 54 and the backing strip and film strip element are then wound together on a mandrel to produce a roll that includes all of the film strip 40 and a portion of the leader strip 36. Before the leading end of the leader strip 36 is attached to the backing strip 32 by leader paster 38, the roll is confined radially to keep it from expanding and a loop or bow 56 is formed in the leading portion of the backing strip 32. After the leading end of the backing strip 32 has been attached to the take-up spool, and while the roll is still radially confined, the film and backing strip assembly 30 is installed in the cartridge casing 10 and the latter is sealed. During the operation of installing the film and backing strip assembly 30 in the cartridge casing 10, a wiper member or the like is employed to position the excess backing strip material in the film take up chamber. Preferably, the take up core is rotated during the assembly process to wind the leading end of the film strip element at least partially around the core, so that the film strip assembly is initially in the condition shown in FIG. 4. Various equipment is well known in the art for producing and loading similar and much more complicated assemblies of film, backing strip, leading and trailing strips, etc., particularly in the art of making roll type film for instant cameras. More particularly, U.S. Pat. No. 3,226,816 shows the basic elements of a machine appropriate for spooling and loading conventional 126 type film cartridges and this equipment could be readily modified by one skilled in the art to produce the film and backing strip assemblies described above. For example, the apparatus shown in the patent just mentioned above could be modified to accept a film strip element produced in a preliminary operation and to include a vacuum head or other similar device for producing the required loop or bow in the backing strip prior to attachment of the leading end of the film strip element to the backing strip.

When the film cartridge is in its initial condition, as shown in FIG. 4, the only significant excess paper is in the free loop 58, which corresponds to the loop or bow 56 shown in FIG. 3. In this context the term "free loop" refers to the portion of the backing strip within the take up chamber 18 that is not in continuous contact with the underlying corresponding portion of the film strip element. In FIG. 4, the "free loop" 58 of backing strip 32 comprises approximately one generally helical convolution, but the free loop would be more abruptly curved or looped if the core were not rotated during the assembly operation to wind leader 36 partially around the core.

Because of the resiliency of the backing strip 32, excess vibration might tend to cause some of the excess backing strip initially in the take-up chamber to migrate to the supply chamber, but this cannot occur because the supply chamber is substantially filled by the supply roll and therefore cannot absorb any excess backing strip. During the initial clockwise film advancing rotation of the take-up core 28, the film strip is drawn taut as it moves through the intermediate cartridge section 20 and unwinds film from the supply roll, thereby rotating that roll in a clockwise direction. Because of the excess backing strip initially provided in the take-up chamber, it might seem that the backing strip 32 would not move through the intermediate cartridge section 25 until the excess backing strip had been absorbed by being wound with the film strip element into the resulting take-up roll, whereupon no backing strip surplus would exist in the take-up chamber. However, as the supply roll is unrolled by the tension of the film strip element, the supply roll generates surplus backing strip, which is directed toward throat 22. Accordingly, the excess backing strip generated in the supply chamber and the friction between the film and backing strip 32 in the intermediate cartridge section 20 cause the film and backing strip to move substantially in unison through that section. Concurrently, excess backing strip is gradually absorbed by the take-up roll, but the excess paper remaining in the take-up chamber remains in the form of a free loop because the tensioned film strip element wraps around each preceding convolution of backing strip to maintain a tightly wound take-up roll.

When the supply roll has been partially unwound, it may tend to "clock spring" in the supply chamber 16. Because the trailing end of the film strip element cannot slip longitudinally relative to the backing strip 32, however, any such clock springing will produce additional excess backing strip in the supply chamber 16; thus continuing to inhibit the migration of excess backing strip from the take-up chamber to the supply chamber.

If a sufficient amount of excess backing strip 32 is initially provided in the take-up chamber 18, that backing strip surplus will not be entirely absorbed until the avaliable film has been completely exposed. Accordingly, the theoretical minimum amount of excess backing strip required will equal approximately $\pi$ times the combined backing strip and film strip element thickness times the number of convolutions of combined film strip element and backing strip that will be wound onto the take-up core in the process of exposing all of the available film. In practice, however, as the balance between the amount of excess backing strip in the two chambers changes, some excess backing strip typically migrates from the supply chamber 16 to the take-up chamber 18 during the latter stages of film winding. Accordingly, somewhat less than this theoretical initial excess amount of backing strip can be provided without detracting significantly from the performance of the cartridge.

As previously mentioned, including excess backing strip in the supply chamber of a 126-type film cartridge is beneficial, per se, to ensure tautness of the film strip element in the intermediate cartridge section 20, but unusual circumstances may cause that excess backing strip to be lost into the supply chamber if the film strip element can slide relative to the backing strip in the case of clock springing of the supply roll. Similarily, the attachment of the trailing end of the film strip element to the backing strip is beneficial, per se, in a standard 126-type cartridge, to ensure against a net backing strip shortage arising because of supply roll "clock springing", but this does not ensure film tautness throughout the entire film operation. Consequently, the invention contemplates the use of either of these improvements alone, but, preferably, the use of both features in conjunction with each other, as described above.

If sufficient excess backing strip is provided to ensure that there will always be a backing strip surplus in the take-up chamber, there will necessarily be a loop or a fold of excess backing strip adjacent the trailing end of the film strip element after all of the available film has been exposed. Similarily, if only the trailing end connection feature of the invention is employed, variations in backing strip and film thickness, winding tension etc., dictate the advisability of providing more surplus backing strip than is theoretically required. This will likewise result in excess backing strip being present adjacent the trailing end of the film strip element after all of the film has been exposed. In either case, the excess backing strip may cause the film strip assembly to jam in the cartridge throat 22. However, such jamming is of no consequence if the last exposed film area has already been wound onto the take-up roll before the jamming occurs. This can be assured by making the trailer strip 50 of the proper length or, if the film strip itself is attached directly to the backing strip, the metering holes in the film strip can be located to ensure that the last exposure area is wound onto the take-up roll before the end of the film strip reaches throat 22.

Although the invention has been depicted and described in the context of a 126 type film cartridge because that type of cartridge potentially poses problems of both net backing strip shortage and backing strip shortage only in the take up chamber, it should be apparent that the invention is equally applicable to 110 type film cartridges and to other similar cartridges.

The invention has been described in detail with a particular reference to a preferred embodiment thereof, but it will be understood that variations and modifications can be effected within the spirit and scope of the invention.

I claim:

1. In a roll film cartridge comprising:
   (a) a housing including means defining a supply chamber and a take-up chamber spaced from one another by an intermediate cartridge section,
   (b) a take-up core rotatably supported in the take-up chamber of said housing, and
   (c) a film strip assembly attached at its leading end to the take-up core and comprising a film strip element and an opaque backing strip attached to one another adjacent the leading end of the film strip element, said film strip assembly extending through the intermediate cartridge section and into the supply chamber where it is initially coiled into a supply roll, the improvement comprising;

means connecting the trailing end of the film strip element to the backing strip to prevent relative longitudinal movement therebetween.

2. The invention defined in claim 1 in which said film strip element comprises an elongate strip of film attached at its trailing end to an elongate trailer strip.

3. In a roll film cartridge comprising:
(a) a housing including means defining a supply chamber and a take-up chamber spaced from one another by an intermediate cartridge section,
(b) a winding core rotatably supported in the take-up chamber of said housing, and
(c) a film strip assembly attached at its leading end to the take-up core and comprising a film strip element and an opaque backing strip attached to one another adjacent the leading end of the film strip element, said film strip assembly extending through the intermediate cartridge section and into the supply chamber where it is initially coiled into a supply roll;

the improvement wherein;

both the leading and trailing ends of the film strip are attached to the backing strip with the length of the backing strip between its points of attachment to the film strip being sufficiently greater than the length of the film strip to initially provide a free loop of backing strip in the take-up chamber for maintaining excess backing strip in the take-up chamber during winding of the film strip assembly onto the winding core in the supply chamber.

* * * * *